Dec. 14, 1965     P. A. ROSS ETAL     3,222,955
INDEXING DEVICE

Filed May 18, 1962     6 Sheets-Sheet 4

INVENTORS
Cletus M. Wessels
Paul A. Ross
BY
Wood, Herron and Evans
ATTORNEYS

# United States Patent Office 3,222,955
Patented Dec. 14, 1965

3,222,955
INDEXING DEVICE
Paul A. Ross, Cincinnati, Ohio, and Cletus M. Wessels, South Fort Mitchell, Ky., assignors to The American Tool Works Company, Cincinnati, Ohio, a corporation of Ohio
Filed May 18, 1962, Ser. No. 195,729
29 Claims. (Cl. 74—826)

This invention relates to indexing devices and more particularly to indexing devices utilized to index turrets of automatic lathes or other machine tools.

Turret indexing mechanisms have long been known which include a tool block having teeth extending downwardly from the bottom of the tool block adapted to seat in and mesh with the teeth of a stationary member mounted upon a turret supporting structure to lock and accurately position the tool block in an indexed position. However, these earlier known indexing machines or devices have required a needlessly expensive multiplicity of complex elements in order to operate the mechanism from a motor driven source of power. In addition, since failure of the mechanism is increased exponentially as the number of elements in the indexing structure is increased, breakdown of these earlier turret mechanisms was undesirably frequent.

Accordingly it has been an objective of this invention to minimize the number of parts or elements required in an automatic turret indexing mechanism in order to decrease the possibility of failure or breakdown.

Another objective of this invention has been to provide a simplified automatic indexing mechanism for automatically indexing a turret from a first position to any one of a plurality of other positions in a minimum of time and with a maximum degree of accuracy.

Another objective of this invention has been to provide a turret indexing mechanism in which the turret is driven by a motor driven drive shaft which has means mounted thereon to move the turret axially of the drive shaft to an unlocked or unclamped position and to rotate the turret to a preselected index position as the motor rotates in one direction and then to move the turret back axially on the drive shaft to a locked position as the motor drives in the reverse direction.

Still another objective of this invention has been to provide an automatic or semi-automatic turret indexing mechanism in which the position of interchangeable turrets or tool blocks is controlled by a plurality of control switches. In this connection, this invention incorporates a novel control cam and control cam driving arrangement which automatically properly locates the turret with respect to the control cam after the tool blocks or turrets are replaced or interchanged.

At the present time the machine tool business is undergoing a change from manually operated machines to machines controlled automatically by tapes or other control systems. This transition has been brought about by the desire to eliminate manual labor and thus decrease the cost of production of parts made upon the machine. Because of the high initial expense or cost involved in the purchase of automatically controlled machines, it is very desirable to maintain the machines in operation as much as possible in order that the purchasers may get back their investment within a relatively short time. One of the factors which substantially contributes toward non-productive or "down" time of an automatic machine is the requirement to replace worn cutting tools and to properly locate the tools in the machine. Accordingly, it has been an objective of this invention to provide an automatic indexing turret mechanism in which the tools in the tool block or turret may be pre-set or, otherwise expressed, the tools may be accurately located in the turret outside of or away from the machine and thereafter, the entire tool block or turret replaced on the indexing mechanism with the tools already properly located therein. This interchangeability of the turrets or tool blocks thus eliminates the necessity to replace the individual tools in the turret while the machine remains idle or non-productive. In addition, interchangeable turrets enable two or more turrets, each having a plurality of tools mounted therein, to be utilized to machine a single given part.

In machine tool turret indexing devices it is also important to minimize the space requirements of the control system in order to provide adequate chip clearance on the machine upon which the turret is mounted. Accordingly it has been an objective of this invention to provide an improved control cam and control switch system which minimizes the space requirements for the control system.

Another objective of this invention has been to provide an indexing device having an automatically operated locating pin to roughly position a turret and hold it against rotation while a motor driven drive shaft is rotated to cause axial movement of the turret relative to the drive shaft to accurately seat and lock the turret in the indexed position.

These and other objects of the invention will be more readily apparent from a description of the drawings in which:

FIGURE 12 is a schematic view of the reversible motor control circuit, Referring to FIGURES 1 and 2, it will be seen that the indexing device of this invention has been illustrated on a machine tool turret although it is to be understood that the invention may be utilized in conjunction with other indexing machines such as indexing tables, dividing heads, etc. The indexing mechanism of the invention is housed within a base 10 which is fixedly mounted upon a supporting member 11. The supporting member 11 may be in the form of a lathe or machine tool bed or may be a plate attached to the base 10. A tool block 12 is rotatably mounted upon the base and has the usual tool receiving recesses 13 in the lateral edge for receiving a plurality of tools (not shown) which are adapted to be moved into a work engaging position as the tool block is indexed. The tools are adapted to be held in position in the recesses 13 by conventional screws 14 threaded into the tool block and adapted to abut against and securely hold the tools within the recesses.

Figure 1:
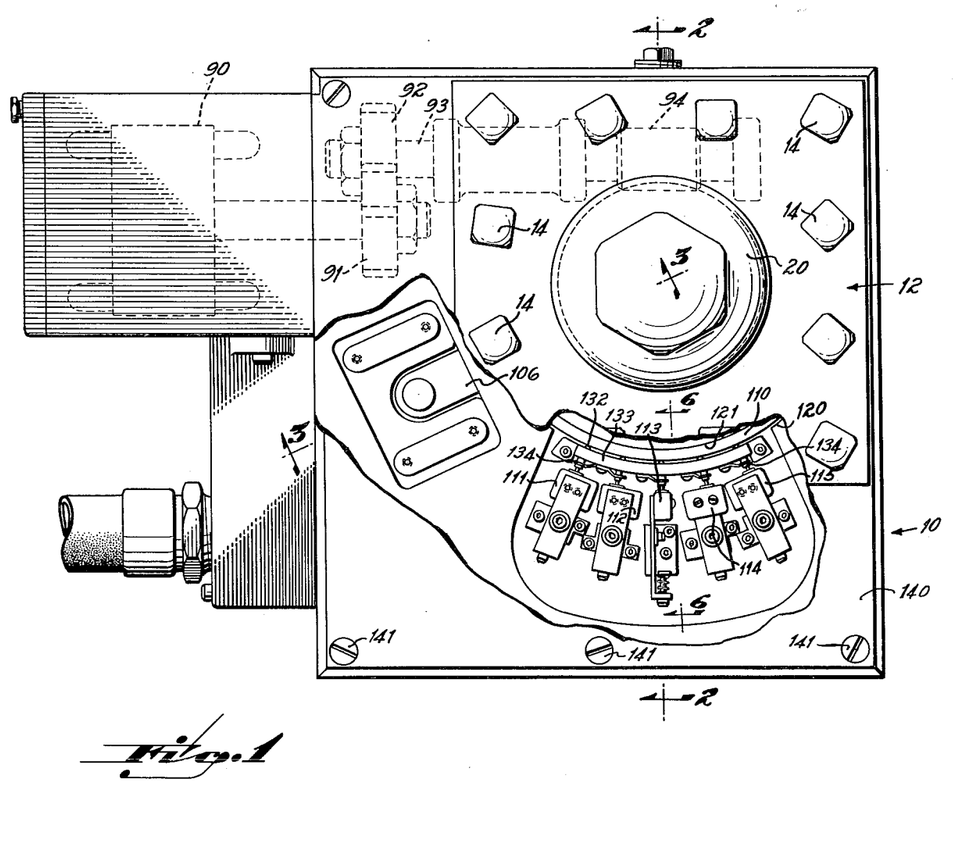
FIGURE 1 is a top plan view partially broken away of the indexing device of this invention.
Figures 2, 3:
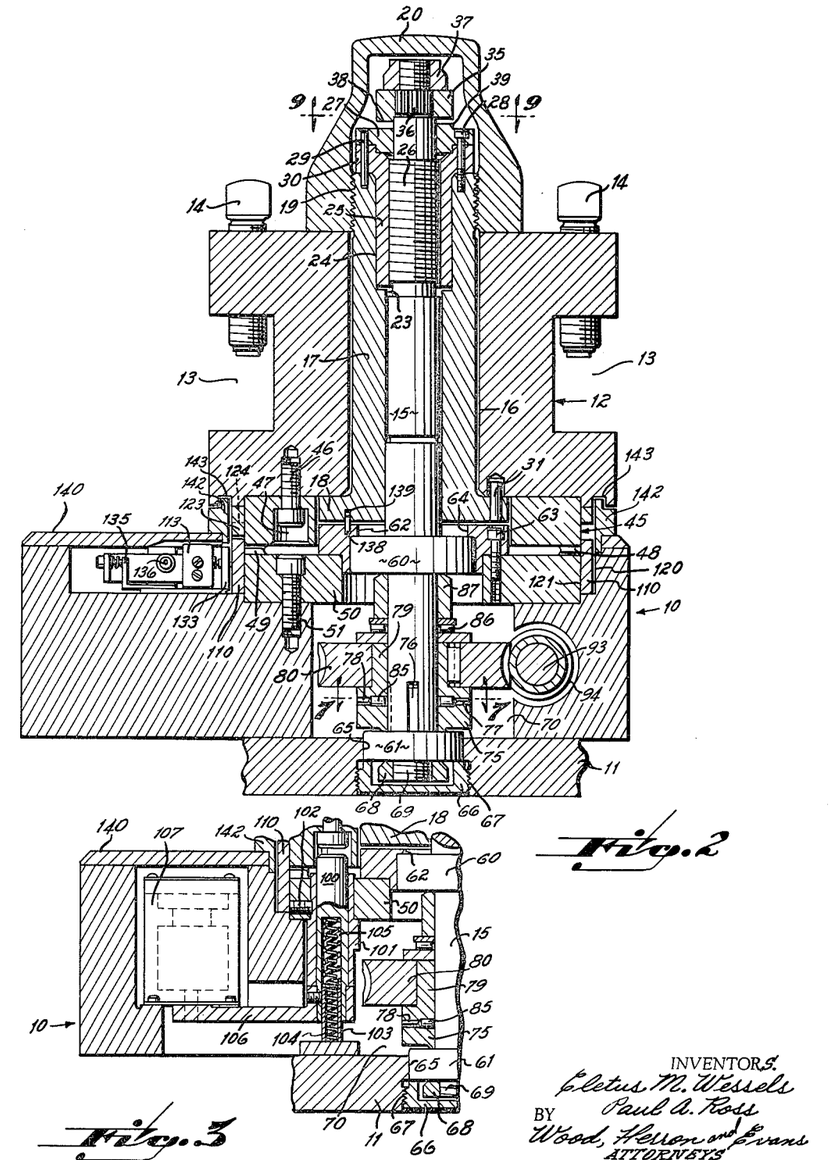
FIGURE 2 is a cross sectional view taken along the line 2—2 of FIGURE 1.
FIGURE 3 is a cross sectional view taken along the line 3—3 of FIGURE 1.

Tool block 12 is supported upon a drive shaft 15 which extends through a central aperture 16 in the tool block. The tool block is connected to the drive shaft so that upon rotation of the drive shaft 15 in a forward or clockwise direction the tool block is moved axially upwardly upon the drive shaft to an unclamped position and thereafter rotated to a preselected index position. When the tool block arrives at the preselected index position, the drive shaft rotates in the reverse direction to move the tool block downwardly relative to the drive shaft to lock or clamp the tool block in the preselected position.

In order to achieve this axial and rotational movement of the tool block 12 upon rotation of the drive shaft 15, a rotatably mounted turret drive sleeve 17 is interposed between the center aperture 16 in the tool block and the drive shaft 15. A flange 18 extends laterally from the bottom of the drive sleeve 17. External threads 19 are provided on the upper end of the drive sleeve 17 to receive internal threads of a cap nut 20 so that when the cap nut 20 is threaded onto the threads 19 of the sleeve 17, the tool block 12 is held in a fixed axial position relative to the sleeve 17 by the bottom surface of the cap nut 20 and the upper surface of the flange 18 on the sleeve 17. A drive pin 31 is mounted in flange 18 and extends upwardly into a recess in tool block 12 to locate the tool block in proper angular relationship to sleeve 17 and to transfer rotational movement of sleeve 17 to tool block 12 so that the sleeve and tool block rotate together.

The upper end of central aperture 23 in the sleeve 17 is counterbored to provide an enlarged opening 24 in the upper end of the sleeve. An internally threaded bushing 25 is mounted within the enlarged opening 24 in threaded engagement with external threads 26 on the upper end of the drive shaft 15. The bushing 25 is held in fixed position relative to the drive sleeve 17 by means of an annular driving ring 27 mounted over the shaft 15 and held in fixed position relative to the drive sleeve 17 by a plurality of lock screws 28 and locating pins 29 which pass through the drive ring 27, a flange 30 of the bushing 25 and are threaded into the drive sleeve 17. While the drive sleeve 17, the bushing 25, and the holddown ring 27 could all be made integral, for ease of assembly and desirable metallurgical properties of the materials, it is preferable to manufacture the three elements separately.

In order to limit the angular displacement or amount of rotational movement which may occur between the drive shaft 15 and the turret drive sleeve 17 before the drive sleeve and drive shaft rotate as a unit, an internally splined drive ring 35 is mounted upon a splined section 36 of the drive shaft 15 above the driving ring 27. The ring 35 is held in fixed position relative to the drive shaft 15 by a lock nut 37 threaded onto the end of the drive shaft 15 above the drive ring 35. A depending drive lug 38 extends downwardly from the drive ring 35 and is engageable with an upwardly extending abutment 39 on the driving ring 27. During rotation of the drive shaft 15 in the forward or clockwise direction, drive lug 38 engages the abutment 39 after the drive shaft has rotated through an angle of approximately 270° at which time the drive sleeve 17 and the tool block 12 mounted thereon rotate with the drive shaft 15 in the forward direction.

To accurately locate and lock the turret in an indexed position, an annular locking ring 45 is rigidly connected to the bottom of the tool block 12 by a plurality of lock screws 46 which pass through counterbored apertures 47 in the ring into threaded engagement with the tool block 12. Lock ring 45 has a plurality of depending teeth 48 on its bottom radial surface which are adapted to mate with or interengage a plurality of upwardly extending teeth 49 on the upper radial surface of a lock ring 50 rigidly connected to the base 10 by a plurality of lock screws 51. The teeth 48 and 49 on the lock rings are interengaged only when the turret is in clamped or locked position. In order to index the turret from one position to another, the turret must be moved axially upwardly so as to disengage these teeth and thereafter rotated to a new index position after which the turret is moved axially downwardly upon the drive shaft to re-engage the teeth with the tool block in the new indexed position.

Drive shaft 15 is supported within the base 10 by a pair of ball bearing races 60, 61 mounted upon the lower end of the drive shaft. The upper race 60 is connected to the base by a bearing supporting ring 62 which is rigidly connected to lock ring 50 by a plurality of locking bolts 63. The bearing supporting ring 62 has an inwardly extending lip or flange 64 which engages the upper surface of the outer race of ball bearing 60 so as to prevent the race 60 and shaft 15 from moving upwardly relative to the base. The outer raceway of the lower ball bearing race 61 is supported within a circular aperture 65 in supporting plate 11. The outer raceway of the ball bearing race 61 is retained within the circular aperture 65 by a lock bolt 66 threaded into an enlarged and threaded portion 67 of aperture 65. The inner raceway of ball bearing race 61 is retained on the drive shaft 15 by a nut 68 threaded onto a threaded section 69 of the drive shaft at the lowermost end of the drive shaft 15.

Figures 4, 5, 6, 7:
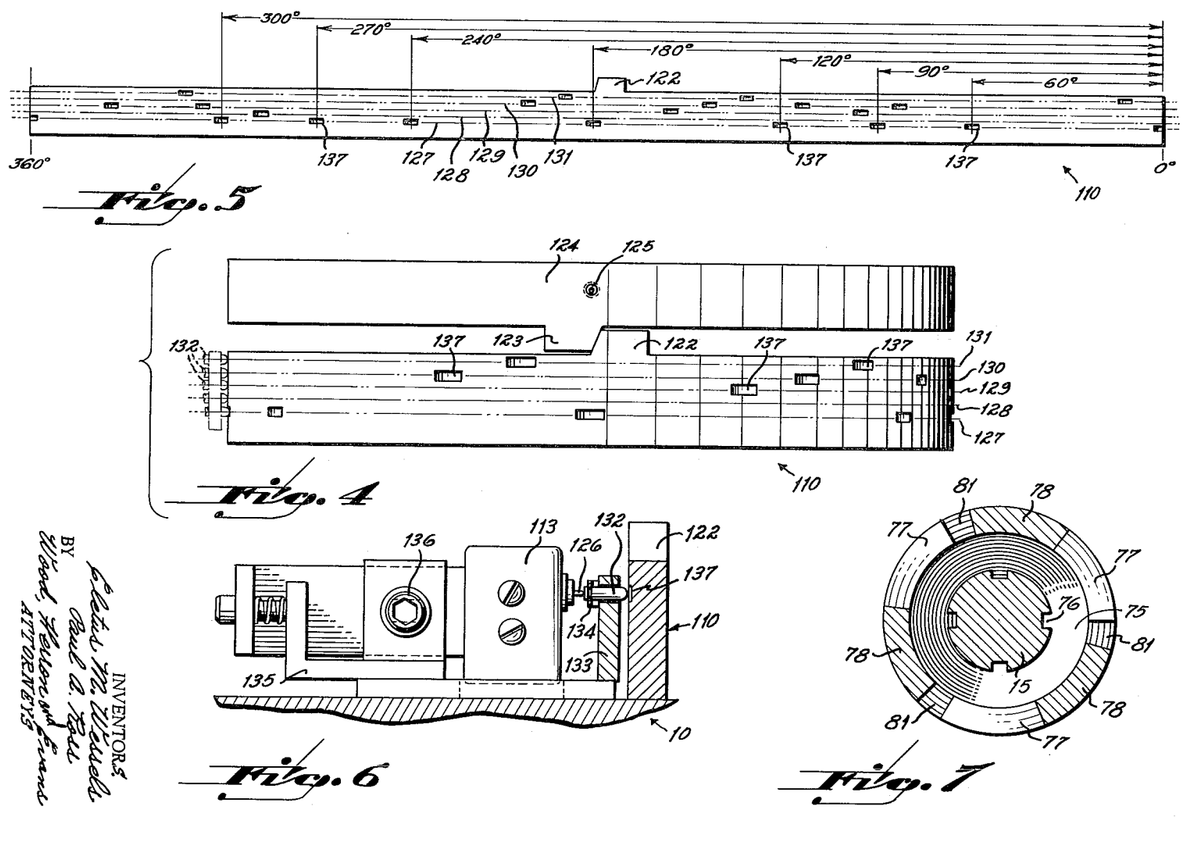
FIGURE 4 is a side elevational view of the turret control cam and the control cam driving sleeve.
FIGURE 5 is a diagrammatic layout of the turret control cam of FIGURE 4.
FIGURE 6 is a cross sectional view taken along the line 6—6 of FIGURE 1.
FIGURE 7 is a cross sectional view taken along the line 7—7 of FIGURE 2.

The drive mechanism to cause rotation of drive shaft 15 is housed with a cavity 70 in the base 10 of the turret assembly. This drive mechanism comprises a driving ring 75 splined or keyed to the shaft 15 by a plurality of keys 76. Driving ring 75 has three upstanding driving teeth or lugs 77 on its upper radial surface. These teeth or driving lugs 77 are engageable with downwardly extending teeth or driving lugs 78 on the lower surface of a bushing 79 rotatably journalled on the shaft 15 above the driving ring 75. The bushing 79 is drivingly keyed to a worm gear 80 so that the worm gear rotates with the bushing 79. As seen in FIGURE 7, the teeth or driving lugs 77 on driving ring 75 define between them recesses 81 of greater width than the width of the teeth 78 extending downwardly into the recesses. Approximately 10° of play or backlash is provided between the teeth or driving lugs 77 and 78 of the driving ring 75 and bushing 79 respectively. This play or backlash is provided between worm gear 80 and drive shaft 15 in order to permit the reversible driving motor which drive the worm gear 80 in both a clockwise and counterclockwise direction to build up starting torque or rotational speed before a load is applied on the motor to start rotation of the drive shaft 15. To decrease the frictional load applied to the motor, thrust bearings 85 are provided between the driving ring 75 and the bottom of the bushing 79. A thrust bearing assembly 86 is also provided between the top of the bushing 79 and the bottom of a spacer ring 87 the upper end of which supports and locates the inner raceway of ball bearing 60.

A reversible drive motor 90 is mounted in the base. This reversible drive motor is operatively connected through a pair of spur gears 91, 92 and drive shaft 93 to a worm screw 94 which, when rotated, causes rotation of the worm gear 80.

Figure 8:
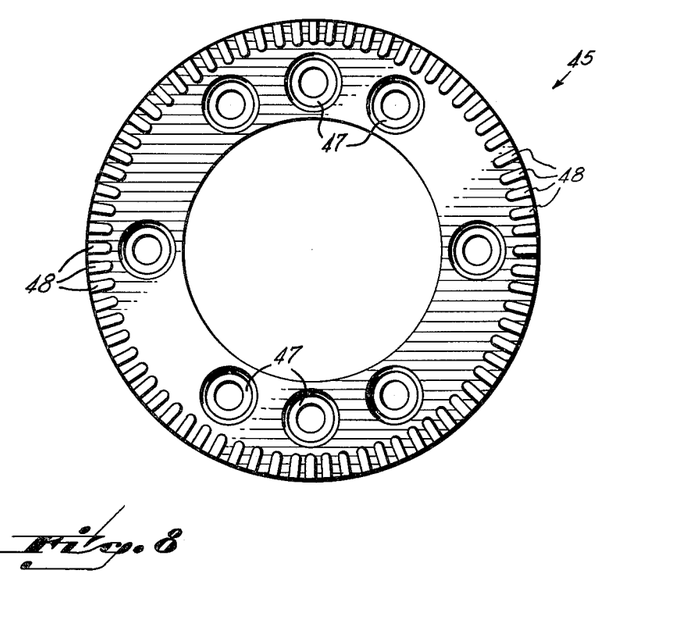
FIGURE 8 is a bottom plan elevational view of the turret clamping clutch ring.
Figure 9:
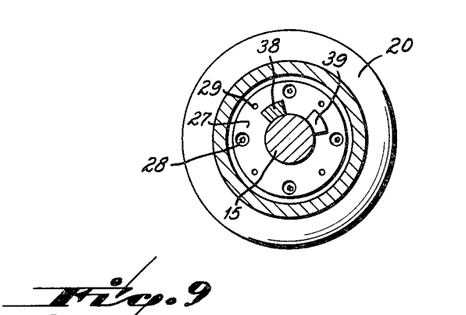
FIGURE 9 is a cross sectional view taken along the line 9—9 of FIGURE 2, FIGURES 10 and 11 are a schematic view of the control circuit utilized to control operation of the indexing device of this invention.

Referring to FIGURE 8, it will be seen that the locking ring 45 which is rigidly connected to the turret tool block 12 has a plurality of shot bolt receiving recesses 47 in its lower surface. A shot bolt 100 is movable into and out of the recesses 47 and when received within one of the recesses, serves to roughly position the turret and restrain it against rotation as it is moved axially downwardly on the drive shaft 15 into accurately seated or locked engagement with the base. In the illustrated embodiment, eight recesses 47 are incorporated into the bottom of the turret locking ring. These eight recesses represent eight index positions to which the turret may be moved or indexed. As shown in FIGURE 8, the recesses are angularly offset from a zero or reference line passing through one of the recesses by 60°, 90°, 120°, 180°, 240°, 270° and 300°. With this spacing four of the recesses 47 are spaced angularly 90° apart while six of the recesses 47 are spaced 60° apart around the bottom of the annular lock ring 45. The purpose of this spacing is to enable the locking ring 45 to be used in conjunction with either a square tool block 12 having four tools mounted there or in combination with a hexagonal tool block having six tools mounted therein and in either case, the tool block may be indexed to a position in which a selected one of the tools is opposite the workpiece.

The shot bolt 100, which is adapted to be received within one of the apertures 47 after the tool block has been rotated to a preselected position, is in the form of a spring biased plunger axially movable within a guide bushing 101 mounted in the base 10 of the turret. Guide bushing 101 is held in a fixed position within the base by a set screw 102 threaded into a threaded aperture in the lock ring 50. A spring assembly 103 and guide sleeve 104 mounted within a recess 105 in the bottom of the shot bolt serves to normally bias the shot bolt 100 into one of the recesses 47 in the bottom of the turret.

To withdraw the shot bolt 100 from a recess 47 so as to permit the turret to be rotated from one index position to another, the shot bolt is connected by a tie bar 106 to an electrically actuated solenoid 107. When the solenoid is energized, the tie bar 106 is forced downwardly so as to withdraw the shot bolt from the recess 47.

Rotational movement of the turret or tool block 12 is controlled by a control cam ring 110 rotatably mounted within the base 10. The cam ring 110 cooperates with a plurality of control switches 111, 112, 113, 114 and 115 to selectively actuate the switches at various angular positions of the turret. The switches are connected to a control circuit (FIGURES 10 and 11) in a binary coding arrangement so that the four switches control eight index positions although they could control as many as sixteen positions. The relationship of these switches and their operation is explained more fully hereinafter in connection with the operation of the electrical circuit of the machine.

Refering to FIGURES 2, and 4, it will be seen that the cam ring 110 is rotatably mounted in the base in a recess defined by the periphery 121 of the lock ring 50 and an inner wall 120 of the base. A lug 122 on the cam ring 110 extends upwardly from the top surface of the ring into driving engagement with a depending lug 123 extending downwardly from the bottom surface of a driving ring 124 attached to the bottom of the tool block 12. Driving ring 124 is telescopically mounted over the locking ring 45 on the base of the turret and is held in an adjusted position on the turret by a set screw 125. The leading edge of the lug 123 is tapered rearwardly and the trailing edge of the lug 122 on the cam ring is tapered in the same direction so that as the turret is rotated in a clockwise direction from one index position to another, the driving lug 123 always forces the cam ring 110 downwardly into a seated position in the base and does not permit it to ride upwardly within the base.

With the cam ring driving system utilized in this invention, the tool block is automatically properly oriented with respect to the control mechanism whenever a new tool block is interchanged on the index mechanism. Since the driving ring 124 is in a fixed position with respect to any given tool held within the tool block, the tool block may be placed on the indexing mechanism and when driven in rotation, the turret will continue to rotate until the driving lug 123 engages the driving lug 122 on the cam ring 110 at which time the turret will be properly located or "zeroed in" with respect to the control cam and control mechanism. As should now be obvious, to interchange tool blocks so as to replace worn tools, enable more tools to be used to machine a particular part, or to set up the machine for a new job, it is only necessary to unscrew the cap nut 20, lift the tool block 12 off of the drive sleeve 17, and replace the old tool block with a new tool block in which the tools have all been preset relative to the driving ring 124. In this manner "downtime" of the machine upon which this indexing mechanism is mounted is minimized for interchanging tools or tool blocks.

To prevent the drive sleeve 17 from being manually and inadvertently rotated relative to the drive shaft 15 during the time when a tool block is removed or replaced, a fixed pin 138 is mounted in the supporting ring 62 and extends upwardly into recesses 139 angularly spaced around the bottom of drive sleeve 17. The angular spacing of the recesses 139 is the same as the spacing of the locating recesses 47 in the ring clutch or locking ring 45 so that the pin 138 will be engaged in a recess whenever the turret 12 is in seated or clamped position on the base. The height of pin 138 is limited so as not to interfere with or prevent rotation of drive sleeve 17 when the tool block 12 is raised an amount sufficient to disengage teeth 48 from teeth 49. Pin 138 and recesses 139 thus serve to prevent inadvertent changes of the angular position of the sleeve relative to the base during changes of the tool blocks. Since a change of the angular position of driving sleeve 17 relative to teeth 49 would result in a change in the relative angular positions of the turret 12 relative to the base it is important that driving sleeve 17 not be rotated during tool block or turret replacement.

The switches 111 through 115 are mounted in the base in radially spaced relationship about the circumference of the cam ring 110. The actuators 126 of the switches are each located in different horizontal planes 127, 128, 129, 130 and 131 (see FIGURE 4). Movement of the switch actuators is controlled by movement of control pins 132 movably mounted within an arcuate mounting plate 133 located between the control cam 110 and the control switches 111 through 115. Each of the control pins 132 is located in the horizontal plane of the switch actuator 126 with which it is associated and is spring biased by a spring 134 into engagement with the cam ring 110. Control switches 111 though 115 are movably mounted upon brackets 135 fixedly attached to the base 10 and are secured in an adjusted position by set screws 136. Thus the switches may be adjusted radially relative to the cam ring 110 so as to set the spacing between the switch and the cam ring and the switches may then be locked in adjusted position by the set screws 136.

As the cam ring 110 is driven in rotation by the drive ring 124 attached to the turret, the small recesses 137 cause reciprocation of control pins 132 as the recesses pass the control pins. Referring to FIGURE 5, it will be seen that eight recesses are provided in the horizontal plane 127 of the cam ring. These recesses each represent one index position of the turret so that the switch 115 having an actuator pin 126 in the horizontal plane 127 will be actuated at each index position of the turret. The other horizontal planes 128, 129, 130 and 131 of the recesses are spaced so as to selectively actuate or move the control switch actuator in each of these planes at various index positions according to a preselected code.

By fastening cam driving dogs 123 at varying angular positions on identical turrets so as to operate the index switches at dissimilar angular positions of the block, the same relative positions of these turret faces may be achieved by selecting dissimilar positions or code numbers. For example, the faces of one four sided turret can be indexed by selecting positions 1, 2, 3 and 4 while another identical four sided turret can be indexed to the same spacial positions by selecting code position numbers 5, 6, 7 and 8 providing a configuration of recesses 47 in the tool block and recesses 137 in the cam ring includes two angularly offset patterns of four equally spaced positions and the driving dogs 123 of the two turrets are displaced angularly the same amount relative to each other as the angular offset of the recesses. The effect of this varying of the angular relationship of the driving dogs 123 of the turrets is to alter the "zero offset" of one turret relative to another and is of importance in the programming of a complete automatic machine where turret positions are interconnected with other machine movements through the prorgamming control system.

The operation of the control cam and the control switches will be more fully explained hereinafter in connection with the operation of the electrical control circuit utilized to control the turret indexing mechanism. However it should be noted at this point that control switch 115, which is located in the horizontal plane 127, is moved each time the turret is located in one of the index positions. This control switch 115 is a safety switch and prevents false signals from the other control switches indicating that the turret is in one of the indexed positions when in fact this is not the case.

The control switches and turret driving mechanism are protected from dust, dirt, chips, etc. by a cover plate 140 held in place on the base by a plurality of screws 141. To protect the teeth 48, 49 of the locking rings 45 and 50 from dust and other extraneous debris, a vertically extending annular dust guard ring 142 is mounted on the base and extends vertically upwardly into an annular recess 143 in the bottom of the tool block.

As an example of the operation of the mechanical components of this indexing mechanism, assume that the tool block 12 is to be moved from the first to the third index position. The third index position is selected manually on a dial indicator preselection switch or alternatively, the preselection takes place in a tape control or other type of control unit. The operation of this control switch and the control circuitry cooperable therewith, will be explained later in greater detail in connection with the operation of the electrical control circuit. Upon selection of the third index position, a circuit to the turret drive motor 90 is closed through the first and second control switches so that upon actuation of a start switch either manually or from the tape control unit, the circuit to the motor is completed. Completion of this circuit to the turret driving motor also actuates a circuit to the shot bolt retracting solenoid 107 to pull the shot bolt 100 from the recess 47 corresponding to the first index position of the tool holder. Simultaneously with the withdrawal of the shot bolt from the recess 47, the turret drive motor starts rotation and drives the worm gear 80. Rotation of the worm gear 80 in turn causes rotation of the bushing 79 keyed thereto. Because of the play between the teeth 78 and 77 on the bushing 79 and drive ring 75 respectively, the gear rotates 10 to 15 degrees before the teeth on the bushing 79 engage the teeth on the drive ring 75 to start the drive ring rotation with an impact blow. Accordingly, after the worm gear has rotated 10 or 15 degrees, rotation of the drive shaft 15 is started.

As the turret drive shaft initially begins to rotate, the tool block 12 is restrained against rotation due to the fact that the teeth 48 on the locking ring 45 are interengaged with the teeth 49 on the locking ring 50. Therefore, as the turret drive shaft rotates, it forces the turret drive sleeve 17 to move axially upwardly on the shaft due to the camming action which takes place between the threads 26 on the drive shaft and the internal threads on the bushing 25 rigidly connected to the drive sleeve 17. Axial movement of the turret drive sleeve in turn moves the tool block and the locking ring 45 attached thereto upwardly. After the turret drive shaft has been rotated approximately 270°, the teeth 48, 49 of the locking rings 45 and 50 move out of engagement and the tool block is free to rotate with the drive shaft. When the drive shaft has rotated approximately 270° in the clockwise direction, the driving lug 38 on drive ring 35 engages the abutment 39 on the ring 27. Since the ring 27 is rigidly connected to the drive sleeve 17, engagement of the driving lug 38 with the abutment 39 causes rotation of drive shaft 15 to be translated into rotation of the turret drive sleeve 17 and thus the tool block 12 mounted upon the drive sleeve 17. As the tool block 12 rotates, the drive ring 124 mounted thereon drives the rotatably mounted cam sleeve or ring 110 until such time as the appropriate cam recesses 137 on the cam ring trip both the first and second control switches 111, 112 to open the forward drive circuit to the motor. Opening of this circuit to the drive motor in turn automatically pulls in a motor reversing circuit which brings motor rotation to zero speed and on into reverse or counterclockwise rotation. The angular position of driving lug 123 on cam driving lug 124 is such that the control switches for a given position are actuated in advance of the turret reaching an index position in order to allow for the time lag associated with switch actuation and the time lag necessary to bring the motor speed to zero after the forward drive is removed and the reverse drive is energized. Simultaneously with the energization of the reverse drive motor circuit, the release circuit of the solenoid 107 holding the shot bolt 100 in the lowered position is actuated and under the bias of the spring assembly 103, the shot bolt 100 moves up into engagement with the recess 47 in the locking ring 45 corresponding to the third index position of the turret. The shot bolt 100 stops the tool block 12 in its approximate index position and prevents it from rotating during the reverse rotation of the motor 90. After the turret drive motor has rotated the worm gear 80 ten or fifteen degrees in the reverse direction to take up the play between the teeth 77 and 78 on the driving ring 75 and bushing 79 respectively, the turret drive shaft begins to rotate in the reverse direction. During reverse rotation of the turret drive shaft 15, the driving lug 38 on the drive ring 35 disengages the abutment 39 connected to the turret drive sleeve 17 so that the turret does not rotate with the drive shaft. Through the camming action of the threads 26 on the drive shaft and the internal threads on the bushing 25, the tool block is pulled axially downwardly to force the teeth 48 on the locking ring 45 into engagement with the teeth 49 on the ring 50. After the turret drive shaft has been driven in the reverse direction through an arc of approximately 270°, the teeth on these locking rings mesh and the turret is very accurately located by the meshing teeth. Seating of the teeth on the ring 45 attached to the tool block and the teeth of the ring 50 upon the base causes a surge of current in the turret drive motor which trips a relay and stops the drive of the turret drive system. The tool block is then indexed to and very accurately located in the third index position.

Figure 10:
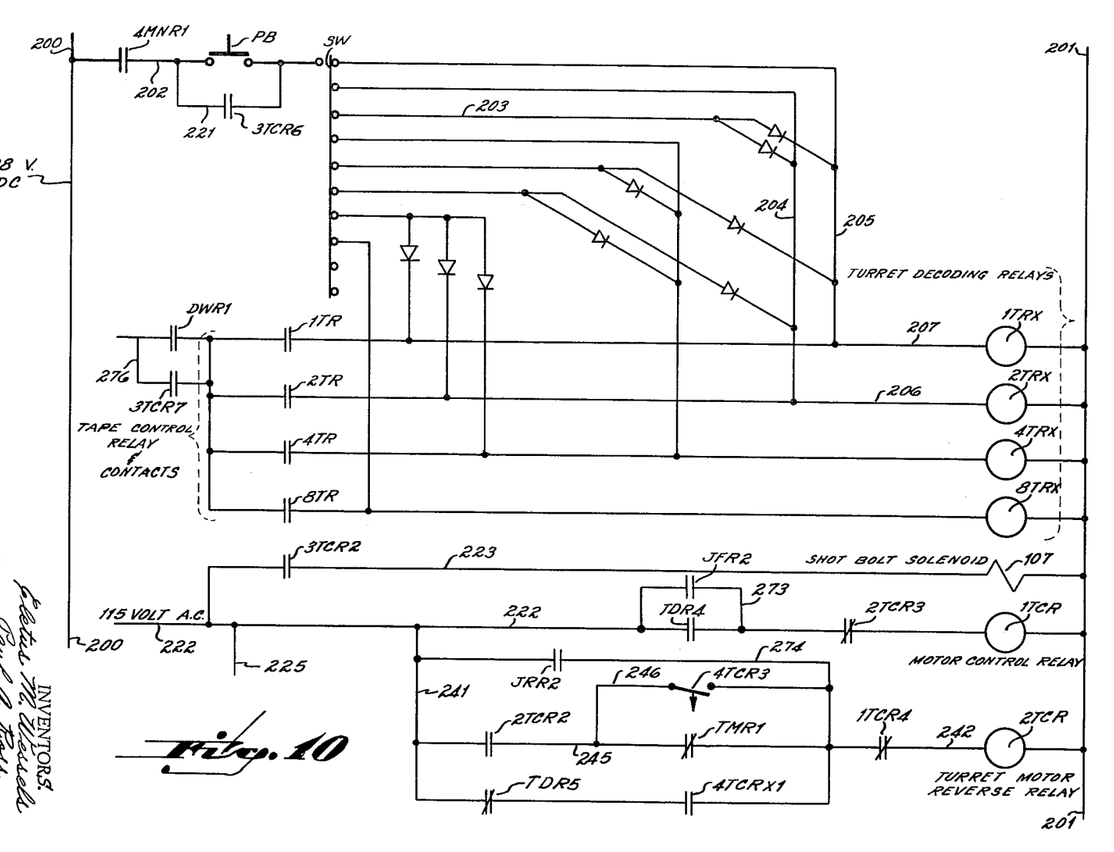
Figures 11, 12:
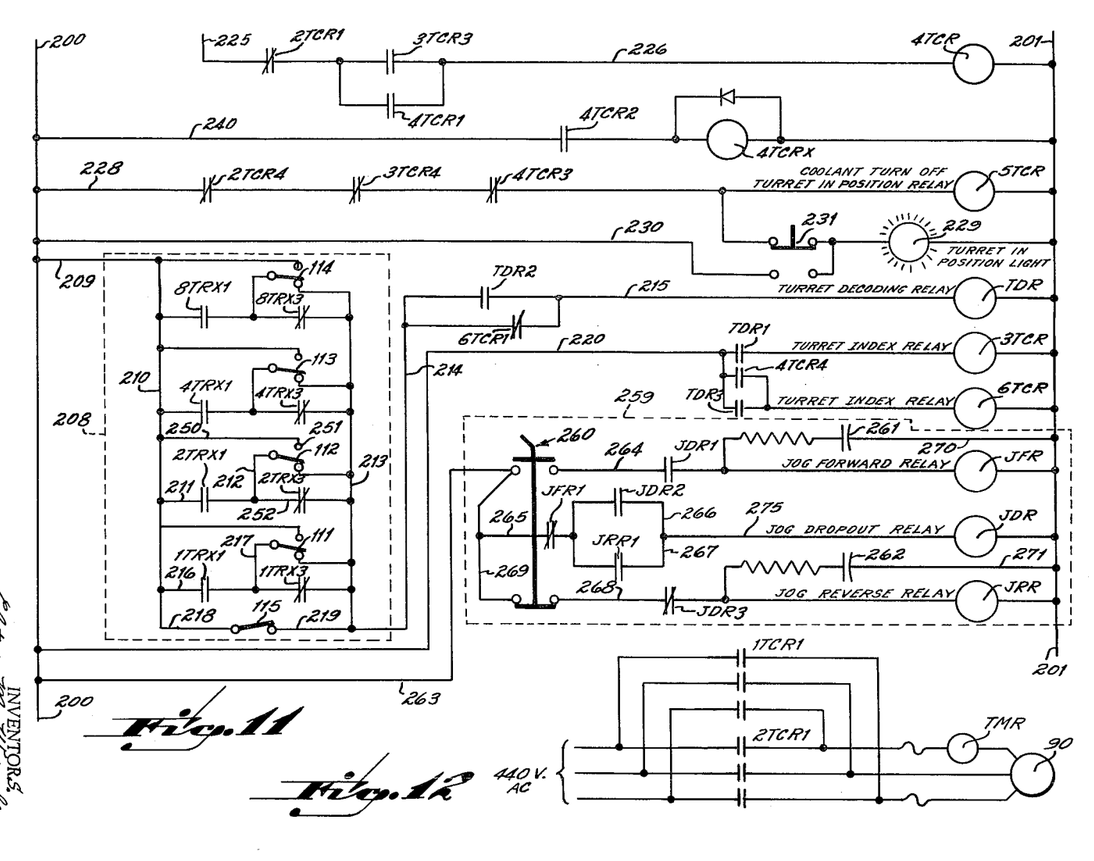

Referring to FIGURES 10, 11 and 12, there is illustrated a control circuit for controlling the motor 90 and solenoid 107 to perform the above sequence of operations. This control circuit can best be described with reference to an indexing sequence of operations.

By way of example, assume that the turret is to be moved from the first to the third index position. The manual selection switch SW is positioned to the desired tool selection or index position, in this case the third index position. A mode selector switch is then moved to the manual position. The mode selector switch (not shown) controls two relays 4MNR and DWR (not shown). When the mode selector switch is in the manual position, it causes the normally open contact 4MNR1 to close and maintains the automatic control contact DWR1 in the open position. If the machine is to be controlled by an automatic tape control or other control system, the mode selector switch is moved to the automatic position which allows the DWR1 contact momentarily to close and maintains the manual control relay 4MNR contacts in the open position. With the selection switch in the third index position and the mode selector switch in the manual position, a manual turret index switch PB is closed momentarily to complete a circuit between power source line 200, 201 through a lead 202, turret index switch PB, selection switch SW, leads 203, 204 and 205, and leads 206 and 207 to turret decoding relays 1TRX and 2TRX.

Energization of any of the turret decoding relays 1TRX, 2TRX, 4TRX or 8TRX causes withdrawal of the shot bolt 100 from recess 47 and rotation of the turret drive motor 90 in the forward direction. When the turret decoding relays 1TRX, 2TRX are energized, turret decoding relay TDR is pulled in through a turret decoding circuit 208. The turret decoding circuit 208 includes the turret control switches 111–115. The switches 111–115 are all normally closed unless the actuating pins 132 associated with each of the switches is engaged in one of the recesses 137 in the cam ring 110. When the actuating pin 132 enters one of the recesses 137, it opens the circuit to the control switch with which the pin is associated. Assuming that the turret is initially in the first position, the control switches 111–115 are all in the closed position since the control switches all operate slightly in advance of their turret index positions. When indexing is initiated and while the turret is in the first index position, the circuit to the turret decoding relay TDR is completed through three parallel circuits: through leads 209, 210, 211, contact 2TRX1 which has been closed by selection of position 3, lead 212, switch 112, leads 213 and 214, and normally closed contact 6TCR1; through leads 209, 210, 216, contact 1TRX1 which has been closed by selection of position 3, lead 217, control switch 111, leads 213 and 214 and contact 6TCR1; and through leads 209, 210, 218, switch 115, leads 219 and 214, and contact 6TCR1. The energizing of turret decoding relay TDR pulls in normally open contacts TDR1 and TDR3 to complete circuits to turret index relays 3TCR and 6TCR via lead 220. In addition, energization of relay TDR closes normally open contact TDR2 to close a holding circuit around contact 6TCR1 which is opened upon energization of relay 6TCR. Energization of turret index relay 3TCR also seals in holding circuits 221 and 276 around manual index switch PB and automatic index contact DWR1 respectively. Energization of turret index relay TDR also closes normally open contact TDR4 to complete a circuit via lead 222 through normally closed contact 2TCR3 to motor control relay 1TCR. In addition, energization of turret index relay 3TCR closes normally open contact 3TCR2 in lead 223 to complete a circuit to shot bolt solenoid 107 to cause the shot bolt 100 to be withdrawn from recess 47. Motor control relay 1TCR pulls in contacts 1TCR1 (FIGURE 12) to start the turret motor 90 in the forward direction.

Energization of turret index relay 3TCR closes a circuit to control relay 4TCR through leads 222, 225, normally closed contact 2TCR1, normally open contact 3TCR3 and lead 226. Relay 4TCR drops in a contact 4TCR1 in a holding circuit around contact 3TCR3. In addition, relay 3TCR drops out normally closed contact 3TCR4 in lead 228 to open a circuit to a machine tool control relay 5TCR. When the indexing device of this invention is utilized in a tape controlled machine, relay 5TCR controls coolant flow and acts to hold off new position information which during normal operation of the machine would be fed from the tape controller to control the positioning of other elements of the machine. The opening of contact 3TCR4 also causes the turret in-position light 229 to turn off. A light checking circuit bypassing lead 228 is provided through lead 230 and a manual control switch 231 so that the light 229 may be periodically check in the event of failure of this light to go on while the turret is in one of its indexed positions.

As the turret passes through the angular position where the switches for turret position two are actuated slightly in advance of turret position two, the switches 115 and 112 open but the circuit to turret decoding relay TDR is maintained through the closed control switch 111.

When the tool turret reaches the third index switch operation positions, the turret decoding circuit 208 is opened through control switches 111, 112 and 115 to drop out turret decoding relay TDR which in turn de-energizes relay 3TCR and opens sealing contact TDR2 to hold relay TDR de-energized as cam recesses 137 coast beyond the control switch operating position. Contact 6TCR1 is open at this time since relay 6TCR remains energized after relay TDR becomes de-energized and opens contact TDR3. In this connection, a holding circuit is provided around contact TDR3 through normally open contact 4TCR4 which is closed upon energization of relay 4TCR. Since energization of relay 4TCR closes the holding circuit through contact 4TRC1 around contact 3TCR3, relay 4TCR remains energized after relay 3TCR is de-energized and until a relay 2TCR is energized to open normally closed contact 2TCR1 in lead 225.

Upon de-energization of relay 3TCR, contact 3TCR2 in lead 223 drops out to open the circuit to shot bolt solenoid 107 at which time the shot bolt 100 enters the recess 47 to locate the turret tool block in its approximate index position. In addition, de-energization of relay TDR causes contact TDR4 to drop out or open the circuit in lead 222 and thus to drop out relay 1TCR to stop motor rotation in the forward direction. De-energization of relay 3TCR also opens sealing circuits 221 and 276 so as to condition these circuits for the next indexing cycle.

With the relay 4TCR energized, a circuit is completed to relay 4TCRX through lead 240 and contact 4TCR2. Upon the dropping out of relays 1TCR and TDR when the turret reaches the third index position, a circuit is completed to turret reversing motor relay 2TCR through leads 222, 241, normally closed contact TDR5, normally open contact 4TCRX1, normally closed contact 1TCR4 and lead 242. When the relay 2TCR drops in, contact 2TCR1 opens the circuit to relay TCR and thus relay 4TCRX is de-energized by the opening of contact 4TCR2. However, a holding circuit to the motor reversing relay 2TCR is maintained through leads 222, 241, through normally open contact 2TCR2, lead 245, normally closed contact TMR1 and normally closed contact 1TCR4. A time delay circuit 246 including a time delay switch 4TCR3 is provided around the normally closed contact TMR1 to maintain the turret motor reverse relay 2TCR energized during the in-rush current period when the turret motor is reversed. So long as the relay 2TCR is energized, the motor reversing circuit to turret motor 90 is maintained through the contact 2TCR1 so that the motor is driven in the reverse direction. Since the shot bolt 100 is in place in the recess 47 of the turret at this time, the turret returns to the clamped position.

When the turret reaches the clamped position, a current surge in the motor driving circuit (FIGURE 12) energizes relay TMR which causes normally closed contact TMR1 in lead 245 to open to de-energize turret reversing relay 2TCR. When the relay 2TCR is de-energized, the contacts 2TCR1 and 2TCR3 are both closed and contact 2TCR2 is opened to lock out turret motor rotation and condition all circuits in the turret motor control system for the next indexing operation. Positioning of the turret in the third position is then completed.

The turret decoding circuit 208 includes holding circuits around the contacts 1TRX1, 2TRX1, 4TRX1 and 8TRX1. These holding circuits are necessary because of the fact that switches 111–114 are used in binary coded combinations to control indexing operations. As an example of an indexing operation in which these holding circuits would be necessary to avoid stopping of the turret in an unselected position, assume that the turret is to be moved from the second index position to the first index position. Because the turret always rotates in the same direction in going from one index position to another, the turret passes through the third position in going from the second to the first position. At the third position, control switches 111, 112 and 115 would all be opened and the turret rotation would stop if a holding circuit were not provided. Therefore at the third position, the turret decoding circuit 208 maintains a closed circuit to turret decoding relay TDR via leads 209, 210, 250, open contact 251 of switch 112, switch 112, leads 212, 252, normally closed contact 2TRX3 (which is in the closed position since the relay 2TRX has not been energized by the selector switch SW) and leads 213 and 214. With the turret decoding relay TDR energized, the turret will of course continue to rotate through the third index position toward the first position The other holding circuits around the contacts 1TRX1, 4TRX1 and 8TRX1 operate in the same manner to avoid stopping of the turret at an incorrect position.

The control system also includes a turret jog circuit 259.

This circuit is provided to assist in the replacing of tool blocks on the indexing machine and is designed to alleviate clamping pressure between the tool block clamping nut 20 and the base 10 so that the clamping nut 20 may be quickly removed manually without the assistance of wrenches or other tools. In addition, the use of this jog circuit to assist in clamping and unclamping of tool blocks enables tool blocks to be replaced and properly clamped even though the height of the replacement tool block is not precisely the same as that of the original.

In order to alleviate this clamping pressure between the nut 20 and the base 10 when the tool block is seated in an indexed position, the motor 90 is driven in the forward direction for a period of time sufficient to allow the tool block to be raised a few thousandths of an inch and the motor is then automatically stopped by the jog control circuit 259. At this time the nut 20 may be easily removed by hand and the tool block removed and replaced. The nut 20 is then threaded onto the sleeve 17 by hand to secure the turret to the sleeve after which the motor 90 is reversed to again clamp the tool block to the base.

The turret jog circuit 259 is controlled by a two position, manually actuated switch 260 which, in the tool block clamped position, maintains the jog circuit 259 in the ready condition. In the ready condition, a circuit is completed through leads 263, 269, switch 260, lead 268 and a normally closed contact JDR3 to a jog reverse relay JRR. Energization of relay JRR closes normally open contact JRR1 to complete a circuit to jog dropout relay JDR via leads 263, 269, 265, normally closed contact JFR1, and leads 267 and 275. When relay JDR is energized, the circuit is in the ready position with the contact JDR3 open and the contacts JDR2 and JDR1 closed. Opening of contact JDR3 opens the circuit to jog reverse relay JRR to open the contact JRR1 to relay JDR. However the jog dropout relay JDR is maintained in the ready or energized condition by the closing of contact JDR2, which maintains a holding circuit around contact JRR1.

To release the tool block clamping pressure so as to permit the removal and replacement of a tool block, the operator moves switch 260 to the "change turret" position which closes the switch contacts in lead 264 and opens the switch contacts in lead 268. A circuit is then completed via lead 263, switch 260, lead 264, and closed contact JDR1 to a jog forward relay JFR. A conventional timing network circuit including a capacitor 261 in lead 270 is connected in parallel with relay JFR to hold the relay JFR energized after power removal for a period of time sufficient to allow the motor 90 to rotate through an arc to raise the tool block a few thousandths of an inch. Energization of relay JFR closes contact JFR2 in lead 273 to energize motor control relay 1TCR which in turn closes contacts 1TRC1 to rotate the motor in the forward direction. Energization of relay JFR also opens contact JFR1 to open the circuit to the jog dropout relay JDR. De-energization of jog dropout relay JDR opens the contact JDR1 and thus causes the relay JFR to drop out after capacitor 261 has discharged. De-energization of relay JDR also opens contact JDR2 and closes contact JDR3 to condition the turret jog circuit 259 for clamping after the tool block has been replaced. At this time the motor 90 will have rotated a sufficient distance to have released the clamping pressure of the tool block on the base so that it may now be easily and quickly removed.

After the tool block has been replaced and the block is ready to be clamped to the base, the operator moves selection switch 260 to the "clamp" position closing the switch contacts in lead 268 and opening the switch contacts in lead 264. Closing of the switch contacts in lead 268 completes a circuit to jog reverse relay JRR via leads 263, 269, 268, and normally closed contacts JDR3. The energizing of relay JRR closes contact JRR2 in lead 274 to complete a circuit to turret motor reverse relay 2TCR. Relay 2TCR closes contacts 2TCR1 to drive the motor in the reverse direction until the tool block is clamped to the base when a surge of current in the motor drive circuit energizes relay TMR to open the contact TMR1 in the holding circuit around contact JRR2. The contact JRR2 opens almost immediately after closing since energization of relay JRR closes the contact JRR1 to energize relay JDR which in turn causes contact JDR3 to open the circuit to relay JRR. In order to assure that the relay JRR stays energized long enough to energize the turret motor reverse relay 2TCR and close contacts 2TCR2 before the circuit to the jog reverse relay JRR is de-energized upon opening of contact JDR3, a timing network including a small capacitor 262 is provided in lead 271 around relay JRR to maintain the jog reverse relay energized for a short interval of time after contact JDR3 opens. The turret motor reverse relay 2TCR closes contact 2TCR2 to maintain the turret motor energized until the motor overload relay TMR is energized upon clamping of the turret to the base. The turret is then properly clamped to the base and the turret jog circuit 259 is conditioned for another cycle of operation upon actuation of the selector switch 260.

The motor control circuit shown in FIGURES 10 and and 11 is adapted to be controlled either from a tape or automatic control programming circuit as well as manually through selection switch SW. In this connection, relays 1TR, 2TR, 4TR and 8TR are provided and are adapted to be energized from a tape reader or other control circuit to selectively energize the turret decoding relays 1TRX, 2TRX, 4TRX and 8TRX respectively.

While a preferred embodiment has been illustrated and described herein, it is to be understood that those skilled in the art may make alterations and modifications of this invention without departing from the spirit and scope of the invention as defined in the appended claims.

Having described our invention, we claim:

1. An indexing device comprising a base,
an indexable member mounted for rotation and axial movement upon said base,
locking members for precisely locating and locking said indexable member in an indexed position upon said base,
said locking members comprising tapered interfitting parts attached respectively to said indexable member and to said base and adapted to cam said indexable member into a precise angular position upon axial movement of said indexable member toward said base,
a motor mounted upon said base,
means responsive to rotation of said motor in a first direction to move said indexable member axially away from said base and to rotate said indexable member relative to said base, and
means responsive to rotation of said motor in a reverse direction for axially moving said indexable member toward said base.

2. An indexing device comprising a base,
an indexable member mounted for rotation and axial movement upon said base,
locking members for precisely locating and locking said indexable member in an indexed position upon said base,
said locking members comprising tapered interfitting parts attached respectively to said indexable member and to said base and adapted to cam said indexable member into a precise angular position upon axial movement of said indexable member toward said base,
a motor driven drive shaft, secured against axial movement,
means responsive to rotation of said shaft in a first direction to move said indexable member axially away from said base and to rotate said indexable member relative to said base, and
means responsive to rotation of said shaft in a reverse direction for axially moving said indexable member toward said base.

3. An indexing device comprising a base,
an indexable member mounted for rotation and axial movement upon said base,
locking means for locking said indexable member in an indexed position upon said base,
said locking means comprising tapered interfitting parts attached respectively to said indexable member and to said base and adapted to cam said indexable member into a precise angular position upon axial movement of said indexable member toward said base.
a motor driven drive shaft secured against axial movement,
means responsive to rotation of said shaft in one direction to move said indexable member axially in a first direction and to rotate said indexable member relative to said base, and
means responsive to rotation of said shaft in a reverse direction for moving said indexable member axially in a direction opposite said first directions.

4. An indexing device comprising a base,
an indexable member mounted for rotation and axial movement upon said base,
a motor driven drive shaft secured against axial movement,
means responsive to rotation of said shaft in one direction to move said indexable member axially in a first direction and to rotate said indexable member relative to said base, and
means responsive to rotation of said shaft in a reverse direction for moving said indexable member axially in a direction opposite said first direction.

5. An indexing device comprising a base,
a motor driven drive shaft mounted for rotational movement within said base, said shaft being secured against axial movement relative to said base,
an indexable member mounted on said drive shaft for rotation and axial movement relative to said base,
means responsive to rotation of said shaft in one direction to move said indexable member axially in a first direction and to rotate said indexable member relative to said base, and
means responsive to rotation of said shaft in a reverse direction for moving said indexable member axially in a direction opposite said first direction.

6. An indexing device comprising a base,
a motor driven drive shaft mounted for rotation within said base,
means securing said drive shaft against axial movement relative to said base,
an indexable member mounted on said drive shaft for rotation and axial movement relative to said base,
means responsive to rotation of said shaft in one direction to move said indexable member axially in a first direction and to rotate said indexable member relative to said base, and
means responsive to rotation of said shaft in a reverse direction to move said indexable member axially in a direction opposite said first direction.

7. An indexing device comrising a base,
a motor driven drive shaft mounted within said base,
means securing said shaft against axial movement relative to said base,
an indexable member mounted on said drive shaft for rotation and axial movement relative to said base,
means responsive to rotation of said shaft in one direction to move said indexable member axially in a first direction and to rotate said indexable member relative to said base,
means responsive to rotation of said shaft in a reverse direction for moving said indexable member axially in a direction opposite said first direction, and
means including at least one of a plurality of control switches operable in response to said indexable member arriving at a preselected one of a plurality of angular positions to cause rotation of said shaft in a reverse direction.

8. An indexing device comprising a base,
an indexable member mounted for rotation and axial movement upon said base,
a motor driven drive shaft mounted within said base for rotational movement but secured against axial movement relative to said base,
means responsive to rotation of said shaft in one direction to move said indexable member axially in a first direction and to rotate said indexable member relative to said base,
means responsive to rotation of said shaft in a reverse direction for moving said indexable member axially in a direction opposite said first direction, and
means including at least one of a plurality of control switches operable in response to said indexable member arriving at a preselected one of a plurality of angular positions to cause rotation of said shaft in a reverse direction.

9. An indexing device comprising a base,
a motor driven drive shaft rotatably mounted within said base,
means securing said drive shaft against axial movement relative to said base,
a drive sleeve mounted upon said shaft,
an indexable member mounted on said drive sleeve for rotation and axial movement relative to said base,
means connecting said sleeve to said shaft operable in response to rotation of said shaft in one direction to move said sleeve axially away from said base and to rotate said sleeve,
means operable in response to rotation of said shaft in a reverse direction to move said sleeve axially toward said base while said sleeve is restrained against rotational movement.

10. An indexing device comprising a base,
a motor driven drive shaft rotatably mounted within said base,
means securing said drive shaft against axial movement relative to said base,
a drive sleeve mounted upon said shaft,
an indexable member mounted on said drive sleeve for rotation and axial movement relative to said base,
cam means connecting said sleeve to said shaft operable in response to rotation of said shaft in one direction to move said sleeve axially away from said base,
means operable in response to rotation of said shaft in a reverse direction to move said sleeve axially toward said base, and
rotational driving means on said shaft engageable with said sleeve after said shaft has rotated through a predetermined angle to drive said sleeve in rotation.

11. An indexing device comprising a base,
an indexable member mounted for rotation and axial movement upon said base,
a motor driven drive shaft,
means responsive to rotation of said shaft in one direction to move said indexable member axially away from said base and to rotate said indexable member relative to said base,
means responsive to rotation of said shaft in a reverse direction for moving said indexable member axially toward said base,
electrically controlled means engageable with said indexable member to limit rotational movement of said indexable member while it is moved axially toward said base, and
means including at least one of a plurailty of control switches operable in response to said indexable member arriving at a preselected one of a plurality of angular positions to reverse the direction of rotation of said shaft and to actuate said electrically controlled means.

12. An indexing turret for use on a machine tool comprising a base,
   a motor driven drive shaft mounted within said base,
   a removable tool block mounted on said base and operatively connected to said drive shaft whereby rotation of said drive shaft is effective to cause rotation of said tool block,
   cam means mounted within said base,
   a plurality of control switches mounted within said base and engageable with said cam means, actuation of at least one of said switches being operable to stop rotation of said tool block in response to said tool block arriving at a preselected one of a plurality of angular positions, and
   locating means on said tool block for fixing the location of said tool block relative to said cam means whereby tool blocks may be replaced on said turret and angularly located relative to said cam means.

13. An indexing turret for use on a machine tool comprising a base,
   motor driven turret driving means mounted within said base,
   a removable tool carrying block mounted on said base and operatively connected to said drive means whereby said drive means is effective to cause indexing movement of said tool block,
   cam means mounted within said base for limited movement independently of said turret driving means,
   control means including control switches mounted within said base and adapted to be actuated by said cam means, said control means being effective to stop movement of said tool block in response to said tool block arriving at a preselected one of a plurality of index positions, and
   other cam means coupled to said tool block, said other cam means including driving means effective to locate said tool block relative to said first cam means whereby other tool blocks may be replaced on said base and automatically located relative to said first cam means.

14. An indexing turret for use on a machine tool comprising a base,
   a removable tool block mounted upon a member extending outwardly from said base,
   clamping members for precisely locating and clamping said tool block in an indexed position upon said base,
   said clamping members comprising tapered interfitting parts attached respectively to said tool block and to said base and adapted to cam said tool block into a precise angular position upon axial movement of said tool block toward said base,
   a motor driven drive mechanism for moving said tool block relative to said base from one index position to another preselected position,
   control means including a plurality of control switches mounted within said base and adapted upon actuation of at least one of said switches to control the rotational movement of said tool block relative to said base, and
   means attached to the outer end of said member for removably securing said tool block upon said member.

15. An indexing turret for use on a machine tool comprising a base,
   a member having threads on its outer end extending outwardly from said base,
   a removable tool block mounted upon said member,
   clamping members for precisely locating and clamping said tool block in an indexed position upon said base,
   said clamping members comprising tapered interfitting parts attached respectively to said tool block and to said base and adapted to cam said tool block into a precise angular position upon axial movement of said tool block toward said base,
   a motor driven drive mechanism for moving said tool block relative to said base from one index position to another preselected position,
   control means including a plurality of control switches mounted within said base and adapted upon actuation of at least one of said switches to control the rotational movement of said tool block relative to said base, and
   threaded means attached to the outer end of said member for removably securing said tool block upon said member.

16. An indexing turret for use on a machine tool comprising a base,
   a removable tool block mounted upon a member extending outwardly from said base,
   clamping members for precisely locating and clamping said tool block in an indexed position upon said base,
   said clamping members comprising tapered interfitting parts attached respectively to said tool block and to said base and adapted to cam said tool block into a precise angular position upon axial movement of said tool block toward said base,
   a motor driven drive mechanism for moving said tool block relative to said base from one index position to another preselected position,
   control means including a plurality of control switches mounted within said base and adapted upon actuation of at least one of said switches to control the rotational movement of said tool block relative to said base,
   removable means attached to the outer end of said member for removably securing said tool block upon said member, and
   locating means on said tool block for locating said tool block relative to said control means.

17. An indexing turret for use on a machine tool comprising a base,
   a removable tool block mounted upon a member extending outwardly from said base,
   clamping members for precisely locating and clamping said tool block in an indexed position upon said base,
   said clamping members comprising tapered interfitting parts attached respectively to said tool block and to said base and adapted to cam said tool block into a precise angular position upon axial movement of said tool block toward said base,
   a motor driven drive mechanism for moving said tool block relative to said base from one index position to another preselected position,
   control means including a cam and a plurality of control switches mounted within said base and adapted upon actuation of at least one of said switches to control the rotational movement of said tool block relative to said base,
   means attached to the outer end of said member for removably securing said tool block upon said member, and
   locating means on said tool block for locating said tool block relative to said cam thereby to orient the tool block relative to the control switches.

18. An indexing device comprising a base,
   an indexable member mounted for rotation and axial movement upon said base,
   clamping means on said indexable member and said base operable to precisely locate said indexable member on said base upon axial movement of said indexable member toward said base, a motor driven drive shaft, means responsive to rotation of said shaft in one direction to move said indexable member axially in a first direction and to rotate said indexable member relative to said base, means responsive to rotation of said shaft in a reverse direction for moving said indexable member axially in a direction opposite said first direction, and control means including at least one of a plurality of control switches operable in response to said indexable member arriving at a preselected one of a plurality of angular positions to cause rotation of said shaft in the reverse direction.

19. An indexing device comprising a base, an indexable member mounted for rotation and axial movement upon said base, clamping means on said indexable member and said base operable to precisely locate said indexable member upon said base upon axial movement of said indexable member toward said base, a motor driven drive shaft, means responsive to rotation of said shaft in one direction to move said indexable member axially in a first direction and to rotate said indexable member relative to said base, means responsive to rotation of said shaft in a reverse direction for moving said indexable member axially in a direction opposite said first direction, rotation restraining means mounted within said base and cooperable with said indexable member to limit angular movement of said member relative to said base while said indexable member is moved axially toward said base, and control means responsive to said indexable member arriving at a preselected one of a plurality of angular positions to actuate said rotation restraining means.

20. An indexing device comprising a base, an indexable member mounted for rotation and axial movement upon said base, clamping means on said indexable member and said base operable to precisely locate said indexable member upon said base upon axial movement of said indexable member toward said base, a motor driven drive shaft, means responsive to rotation of said shaft in one direction to move said indexable member axially in a first direction and to rotate said indexable member relative to said base, means responsive to rotation of said shaft in a reverse direction for moving said indexable member axially in a direction opposite said first direction, rotation restraining means movably mounted within said base and engageable with said indexable member to limit angular movement of said member relative to said base while said indexable member is moved axially toward said base, and control means responsive to said indexable member arriving at a preselected one of a plurality of angular positions to actuate said rotation restraining means into engagement with said indexable member.

21. An indexing device comprising a base, a shaft member mounted within said base, a sleeve member rotatably journalled upon said shaft member, an indexable block mounted upon said sleeve for rotation and axial movement relative to said base, motor means operable to drive one of said members in rotation, means interconnecting said shaft and sleeve operable upon rotation of said driven member in one direction to move said indexable block axially in a first direction and to rotate said indexable block relative to said base, means operable upon rotation of said driven member in a reverse direction to move said indexable block axially in a direction opposite said first direction, and means including at least one of a plurality of control switches operable in response to said indexable block arriving at a preselected one of a plurality of angular positions to cause rotation of said driven member in a reverse direction.

22. An indexing device comprising a base, a shaft member mounted within said base, a sleeve member rotatably journalled upon said shaft, an indexable block mounted upon one of said members for rotation and axial movement relative to said base, motor means operable to drive one of said members in rotation, and means interconnecting said shaft and sleeve operable in response to rotation of said driven member in one direction to move said indexable block axially in a first direction and to rotate said indexable block relative to said base, and means operable in response to rotation of said driven member in a reverse direction to move said indexable block axially in a direction opposite said first direction.

23. An indexing device comprising a base, a shaft member mounted within said base, a sleeve member rotatably journalled upon said shaft, an indexable block mounted upon said sleeve for rotation and axial movement relative to said base, interengageable clamping means mounted respectively upon said base and indexable member operable to accurately locate said indexable member on said base upon axial movement of said indexable member toward said base, motor means operable to drive one of said members in rotation, means interconnecting said shaft member and sleeve member operable upon rotation of said driven member in one direction to move said indexable block axially in a first direction and to rotate said indexable block relative to said base, means operable upon rotation of said driven member in a reverse direction to move said indexable block axially in a direction opposite said first direction, and means including at least one of a plurality of control switches operable in response to said indexable block arriving at a preselected one of a plurality of angular positions to cause rotation of said driven member in a reverse direction.

24. An indexing device comprising a member to be indexed which is mounted for rotational and axial movement relative to a base, drive means including a single motor for moving said member, means operable upon rotation of the motor in one direction to both move said member away from the base and then rotate said member relative to the base, and means operable upon reversal of the direction of rotation of the motor to move said member axially toward the base.

25. An indexing device comprising a base, an indexable member mounted for rotation and axial movement upon said base, locking members for precisely locating and locking said indexable member in an indexed position upon said base, said locking members comprising tapered interfitting parts attached respectively to said indexable member and to said base and adapted to cam said indexable member into a precise angular position upon axial movement of said indexable member toward said base, drive means including a single motor for moving said member, means responsive to rotation of said motor in a first direction to move said indexable member axially away from said base and to rotate said indexable member relative to said base, means responsive to rotation of said motor in a reverse direction for moving said indexable member axially toward said base, and means responsive to location of said indexable member at a new rotational index position to reverse the direction of rotation of said motor.

26. An indexing device comprising a base, an indexable member mounted for rotation and axial movement upon said base, locking members for precisely locating and locking said indexable member in an indexed position upon said base, said locking members comprising tapered interfitting parts attached respectively to said indexable member and to said base and adapted to cam said indexable member into a precise angular position upon axial movement of said indexable member toward said base, a motor driven drive shaft, means responsive to rotation of said shaft in a first direction to both move said indexable member axially way from said base and to rotate said indexable member relative to said base, means responsive to rotation of said shaft in a reverse direction for moving said indexable member axially toward said base, and means responsive to arrival of said indexable member at a new index position to reverse the direction of rotation of said shaft.

27. An indexing device comprising a base, an indexable member mounted for rotation and axial movement upon said base, locking means for locking said indexable member in an indexed position upon said base, said locking means comprising tapered interfitting parts attached respectively to said indexable member and to said base and adapted to cam said indexable member into a precise angular position upon axial movement of said indexable member toward said base, a motor driven drive shaft, means responsive to rotation of said shaft in one direction to both move said indexable member axially in a first direction and to rotate said indexable member relative to said base, means responsive to rotation of said shaft in a reverse direction for moving said indexable member axially in a direction opposite said first direction, and means responsive to arrival of said indexable member at a new index position to reverse the direction of rotation of said shaft.

28. An indexing device comprising a base, an indexable member mounted for rotation and axial movement upon said base, a motor driven drive shaft, means responsive to rotation of said shaft in one direction to both move said indexable member axially in a first direction and to rotate said indexable member relative to said base, means responsive to rotation of said shaft in a reverse direction for moving said indexable member axially in a direction opposite said first direction, and means responsive to arrival of said indexable member at a new index position to reverse the direction of rotation of said shaft.

29. An indexing device comprising a base, a motor driven drive shaft mounted within said base, an indexable member mounted on said drive shaft for rotation and axial movement relative to said base, means responsive to rotation of said shaft in one direction to both move said indexable member axially in a first direction and to rotate said indexable member relative to said base, means responsive to rotation of said shaft in a reverse direction for moving said indexable member axially in a direction opposite said first direction, and means responsive to arrival of said indexable member at a new index position to reverse the direction of rotation of said shaft.

References Cited by the Examiner

UNITED STATES PATENTS

| | | | |
|---|---|---|---|
| 2,902,889 | 9/1959 | Trechsel | 74—823 |
| 2,936,656 | 5/1960 | Conover | 74—826 |
| 2,940,341 | 6/1960 | Diener | 74—824 |
| 3,048,059 | 8/1962 | Cross | 74—826 X |
| 3,054,333 | 9/1962 | Brainard | 74—826 X |
| 3,111,044 | 11/1963 | Diener et al. | 74—826 |

MILTON KAUFMAN, *Primary Examiner.*

BROUGHTON G. DURHAM, *Examiner.*